(12) United States Patent
Yoshiura et al.

(10) Patent No.: US 10,069,445 B2
(45) Date of Patent: Sep. 4, 2018

(54) MOTOR CONTROLLER AND METHOD FOR CONTROLLING MOTOR

(71) Applicant: KABUSHIKI KAISHA YASKAWA DENKI, Kitakyushu-shi (JP)

(72) Inventors: Yasufumi Yoshiura, Kitakyushu (JP); Yasuhiko Kaku, Kitakyushu (JP); Yusuke Oka, Kitakyushu (JP); Atsuo Ikeda, Kitakyushu (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 0 days.

(21) Appl. No.: 14/945,434

(22) Filed: Nov. 19, 2015

(65) Prior Publication Data
US 2016/0149523 A1 May 26, 2016

(30) Foreign Application Priority Data
Nov. 21, 2014 (JP) .................. 2014-237187

(51) Int. Cl.
*H02P 7/00* (2016.01)
*H02P 6/08* (2016.01)
(Continued)

(52) U.S. Cl.
CPC .................. *H02P 6/08* (2013.01); *G05B 1/00* (2013.01); *H02P 6/17* (2016.02); *H02P 6/34* (2016.02);
(Continued)

(58) Field of Classification Search
CPC ........ G05B 19/19; G05B 19/404; G05D 3/12; H02P 21/18; H02P 21/22
See application file for complete search history.

(56) References Cited

U.S. PATENT DOCUMENTS 5,223,778 A * 6/1993 Svarovsky ............. G05B 11/42
318/609
6,469,860 B1 * 10/2002 Hedding ................ G11B 5/584
360/291
(Continued)

FOREIGN PATENT DOCUMENTS

CN 103797194 5/2014
EP 2985907 2/2016
(Continued)

OTHER PUBLICATIONS

Japanese Office Action for corresponding JP Application No. 2014-237187, dated Jul. 22, 2016 (w/ English machine translation).
(Continued)

*Primary Examiner* — Shawki S Ismail
*Assistant Examiner* — Zoheb Imtiaz
(74) *Attorney, Agent, or Firm* — Mori & Ward, LLP

(57) ABSTRACT

A motor controller to control a motor includes a position controller, a speed controller, a first integrator, and a second integrator. The position controller is configured to generate a speed command based on a position error between a position command and a motor position. The speed controller is configured to generate a torque command to be input to the motor based on a speed error between the speed command and a motor speed. The first integrator is configured to calculate an integral value of the position error to be added to the position error. The second integrator is configured to calculate an integral value of the speed error to be added to the speed error.

22 Claims, 21 Drawing Sheets

(51) Int. Cl.
*G05B 1/00* (2006.01)
*H02P 23/00* (2016.01)
*H02P 23/18* (2016.01)
*H02P 6/34* (2016.01)
*H02P 6/17* (2016.01)

(52) U.S. Cl.
CPC .......... *H02P 23/0004* (2013.01); *H02P 23/18* (2016.02)

(56) References Cited

U.S. PATENT DOCUMENTS

| | | | | |
|---|---|---|---|---|
| 6,515,442 | B1* | 2/2003 | Okubo | G05B 19/19 318/560 |
| 6,553,271 | B1* | 4/2003 | Morrell | B60L 11/18 700/37 |
| 2004/0179290 | A1* | 9/2004 | Kohso | G11B 5/556 360/78.05 |
| 2006/0144182 | A1* | 7/2006 | Taniguchi | G01P 7/00 74/479.01 |
| 2006/0208683 | A1* | 9/2006 | Ide | G05D 3/12 318/609 |
| 2008/0036413 | A1 | 2/2008 | Ohta et al. | |
| 2010/0286948 | A1* | 11/2010 | Terada | H02P 21/0035 702/150 |
| 2010/0295497 | A1* | 11/2010 | Takamatsu | H02P 23/18 318/671 |
| 2012/0229069 | A1* | 9/2012 | Ohta | H02P 3/00 318/601 |
| 2013/0234642 | A1* | 9/2013 | Igarashi | B25J 9/1641 318/611 |
| 2013/0249465 | A1 | 9/2013 | Kirihara et al. | |
| 2013/0307452 | A1* | 11/2013 | Sonoda | H02P 6/18 318/400.32 |
| 2014/0103853 | A1* | 4/2014 | Yoshida | H02P 29/02 318/563 |
| 2014/0191690 | A1 | 7/2014 | Yanagisawa | |
| 2014/0292248 | A1* | 10/2014 | Baloch | H02P 21/13 318/561 |
| 2015/0008861 | A1* | 1/2015 | Sonoda | G05B 13/04 318/504 |
| 2015/0115514 | A1* | 4/2015 | Ogawa | B23Q 3/08 269/57 |
| 2016/0315574 | A1* | 10/2016 | Kawashima | H02K 41/031 |

FOREIGN PATENT DOCUMENTS

| | | |
|---|---|---|
| JP | 2013-121283 | 6/2013 |
| JP | 2013-198384 | 9/2013 |
| WO | WO 2006/011519 | 2/2006 |
| WO | WO 2014/167808 | 10/2014 |

OTHER PUBLICATIONS

Chinese Office Action for corresponding CN Application No. 201510795437.3, dated Jan. 29, 2018 (w/ English machine translation).

* cited by examiner

FIG. 5

Exemplary gain setting values

|  | Comparative example (Position-PI-speed-P control) | | Equivalent to this embodiment (Position-PI-speed-PI control) | |
|---|---|---|---|---|
|  | L1 | L2 | L3 | L4 |
| Kv[Hz] | 40 | 200 | 40 | 200 |
| Kp[1/s] | 40 | 200 | 40 | 200 |
| Tpi[ms] | 100 | 20 | 100 | 20 |
| Ti[ms] | — | — | 7.95 | 1.59 |

FIG. 21

Exemplary gain setting values

| | Comparative example (Position-P-speed-PI control plus speed FF control) | Embodiment (Position-PI-speed-PI control plus speed FF control plus torque FF control) |
|---|---|---|
| Kv[Hz] | 351.5 | 200 |
| Kp[1/s] | 221.6 | 200 |
| Tpi[ms] | — | 20 |
| Ti[ms] | 8.00 | 1.59 |
| Tf[ms] | 0.11 | 0.20 |
| Vff[%] | 100 | 100 |
| Tff[%] | 0 | 90 |
| Tim[ms] | 2.30 | — |
| Kvm[Hz] | 140 | — |
| Dp[%] | — | 10 |
| *Dcomp* [%, Rated torque/1000min$^{-1}$] | — | 8.2 |

MOTOR CONTROLLER AND METHOD FOR CONTROLLING MOTOR

CROSS-REFERENCE TO RELATED APPLICATIONS

The present application claims priority under 35 U.S.C. § 119 to Japanese Patent Application No. 2014-237187, filed Nov. 21, 2014. The contents of this application are incorporated herein by reference in their entirety.

BACKGROUND

Field of the Invention

The embodiments disclosed herein relate to a motor controller and a method for controlling a motor.

Discussion of the Background

WO 2006/011519 discloses a servo controller including a position controller and a speed controller. In order to make a position error close to zero, the position controller performs proportional control (P control), and the speed controller performs proportional integral control (PI control or I-P control). In addition, the servo controller performs speed feed-forward (FF) control.

SUMMARY

According to one aspect of the present disclosure, a motor controller to control a motor includes a position controller, a speed controller, a first integrator, and a second integrator. The position controller is configured to generate a speed command based on a position error between a position command and a motor position. The speed controller is configured to generate a torque command to be input to the motor based on a speed error between the speed command and a motor speed. The first integrator is configured to calculate an integral of the position error to be added to the position error. The second integrator is configured to calculate an integral of the speed error to be added to the speed error.

According to another aspect of the present disclosure, a method for controlling a motor includes generating a speed command based on a position error between a position command and a motor position. A torque command to be input to the motor is generated based on a speed error between the speed command and a motor speed. An integral of the position error to be added to the position error is calculated. An integral of the speed error to be added to the speed error is calculated.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5 is a table of parameters set according to a configuration of a comparative example and according to a configuration of the embodiment in simulation of FIGS. 3 and 4;

FIG. 21 is a table of parameters set according to the configuration of the comparative example and according to the configuration of the embodiment in simulation of FIGS. 13 to 20.

DESCRIPTION OF THE EMBODIMENTS

Figure 1:
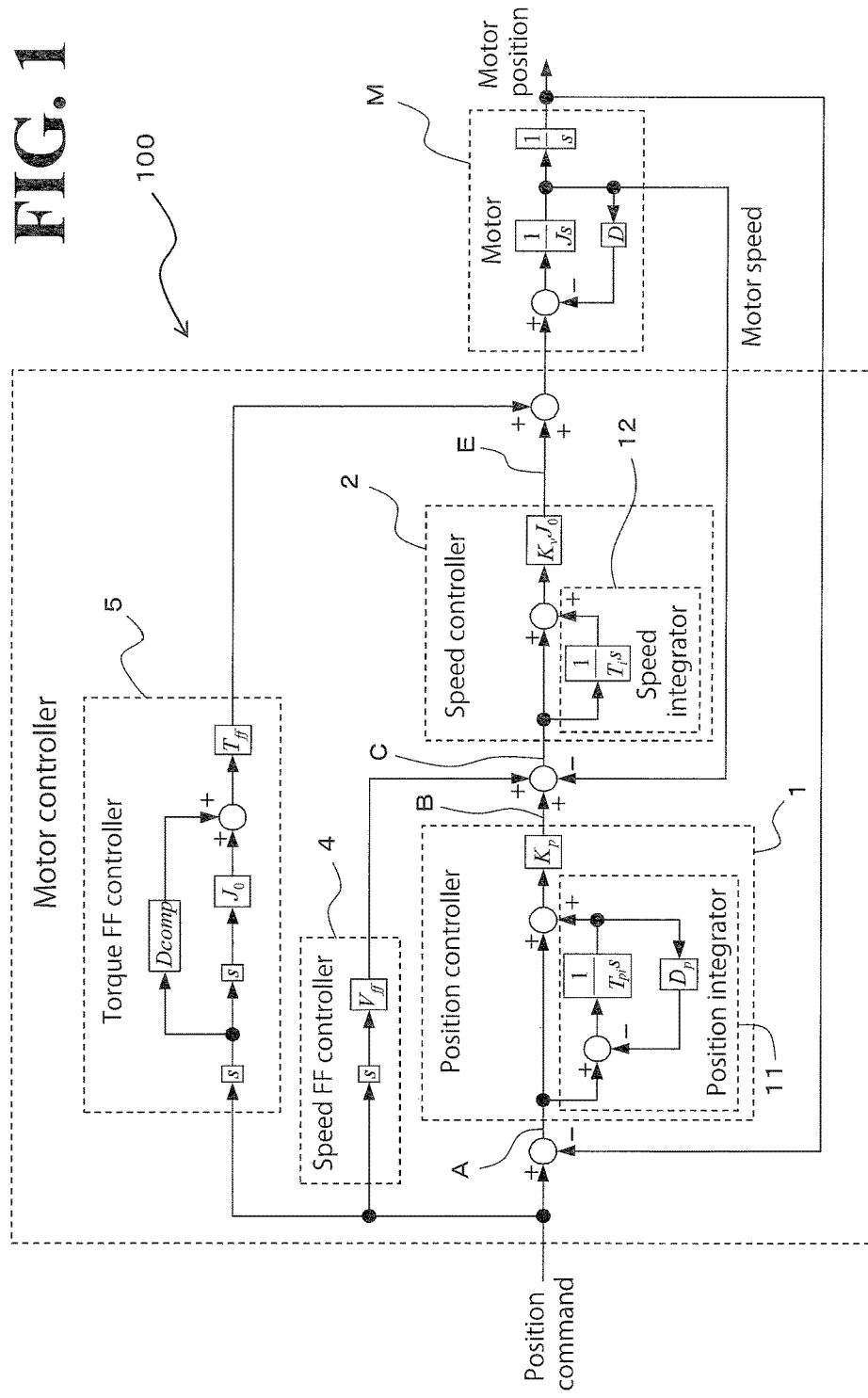
FIG. 1 is a block diagram illustrating a system configuration of a whole motor controller according to an embodiment.

The embodiments will now be described with reference to the accompanying drawings, wherein like reference numerals designate corresponding or identical elements throughout the various drawings.

Outline of Configuration of Motor Controller

First, by referring to FIG. 1, a schematic configuration of a motor controller according to this embodiment will be described. As illustrated in FIG. 1, a motor controller 100 controls the rotation position (rotation angle; referred to as motor position in the drawings) of a motor M based on a position command input from an upper-level controller, not illustrated. The following description will be concerning the components of the motor controller 100 in relation to each other, and internal configurations of the components will be described in detail later. The illustrations in the drawings and the following description will be all given based on transfer functions. In FIG. 1, the motor controller 100 according to this embodiment includes a position controller 1, a speed controller 2, a speed feed-forward controller 4, and a torque feed-forward controller 5.

Based on a position error (see A in FIG. 1), which is a difference between the input position command and the rotation position of the motor M, described later, the position controller 1 outputs a speed command (see B in FIG. 1) to reduce the position error. In this embodiment, the position controller 1 performs what is called PI control using a position integrator 11 (which is the first integrator, the imperfect integrator) and a position control gain $K_p$. The position integrator 11 calculates an integral value of the position error to be added to the position error. The position error is added to an output of the position integrator 11, and the sum is multiplied by the position control gain $K_p$. In this manner, the position controller 1 performs the PI control.

Based on a speed error (see C in FIG. 1), which is a difference between the speed command from the position controller 1 and a rotation speed of the motor M (referred to as motor speed in the drawings), described later, the speed controller 2 outputs a torque command (see E in FIG. 1) to reduce the speed error. In this embodiment, the speed controller 2 performs what is called PI control using a speed integrator 12 (which is the second integrator) and a speed control gain $K_v$ (and a total moment of inertia $J_0$). The speed integrator 12 calculates an integral value of the speed error to be added to the speed error. The speed error is added to the output of the speed integrator 12, and the sum is multiplied by the speed control gain $K_v$ (and the total moment of inertia $J_0$). In this manner, the speed controller 2 performs the PI control.

Based on the position command, the speed feed-forward controller 4 generates a speed feed-forward command to reduce the position error, and adds the speed feed-forward command to the speed command.

Based on the position command, the torque feed-forward controller 5 generates a torque feed-forward command to reduce the position error, and adds the torque feed-forward command to the torque command.

The motor M generates torque using drive current that accords with the torque command so as to drive a load machine, not illustrated.

The motor controller 100 according to this embodiment having the above-described configuration has a dual loop configuration made up of a position control feedback loop and a speed control feedback loop. Specifically, the motor controller 100 includes the position control feedback loop (hereinafter referred to as position control loop). In the position control loop, after the position command is input from the upper-level controller, not illustrated, a control signal is transmitted through the position controller 1, the speed controller 2, and the motor M in this order, and a detection signal of the motor position is fed back. Also, the motor controller 100 includes the speed control feedback loop (hereinafter referred to as speed control loop). In the speed control loop, a control signal is transmitted through the speed controller 2 and the motor M in this order, and a detection signal of the motor speed is fed back. To simplify the description of the whole system, the following description of this embodiment omits description of a current controller to output a drive current by PWM control, for example, to the motor M based on the torque command, and description of a current control feedback loop incorporated in the current controller.

Features of this Embodiment

In recent years, to improve response performance of motor controllers including the above-described position control loop, there is a need for error-less control, which constantly keeps the position error between the position command and the motor position as close to zero as possible. The position error will now be described in detail. As represented in the uppermost time chart illustrated in FIG. 2, the position error is a difference between a position command speed (a speed-equivalent value obtained by first-order time differential of the position command) that changes over time and an actually output motor difference position (a speed-equivalent value detected as a motor position change amount at every control sampling cycle). The position error includes a steady-state error and an acceleration/deceleration error. The steady-state error is in a steady-state range within which the motor speed is constant. The acceleration/deceleration error is in an acceleration/deceleration range within which the motor speed is increased or decreased.

In the dual feedback loop configuration described above, a method generally employed to implement control as close to the error-less control as possible is to provide one of the position controller 1 and the speed controller 2 with a proportioner (P) and/or an integrator (I) so as to perform what is called PI control (or I-P control). Another method is to perform the speed feed-forward control in addition to the PI control (or I-P control).

Figure 2:
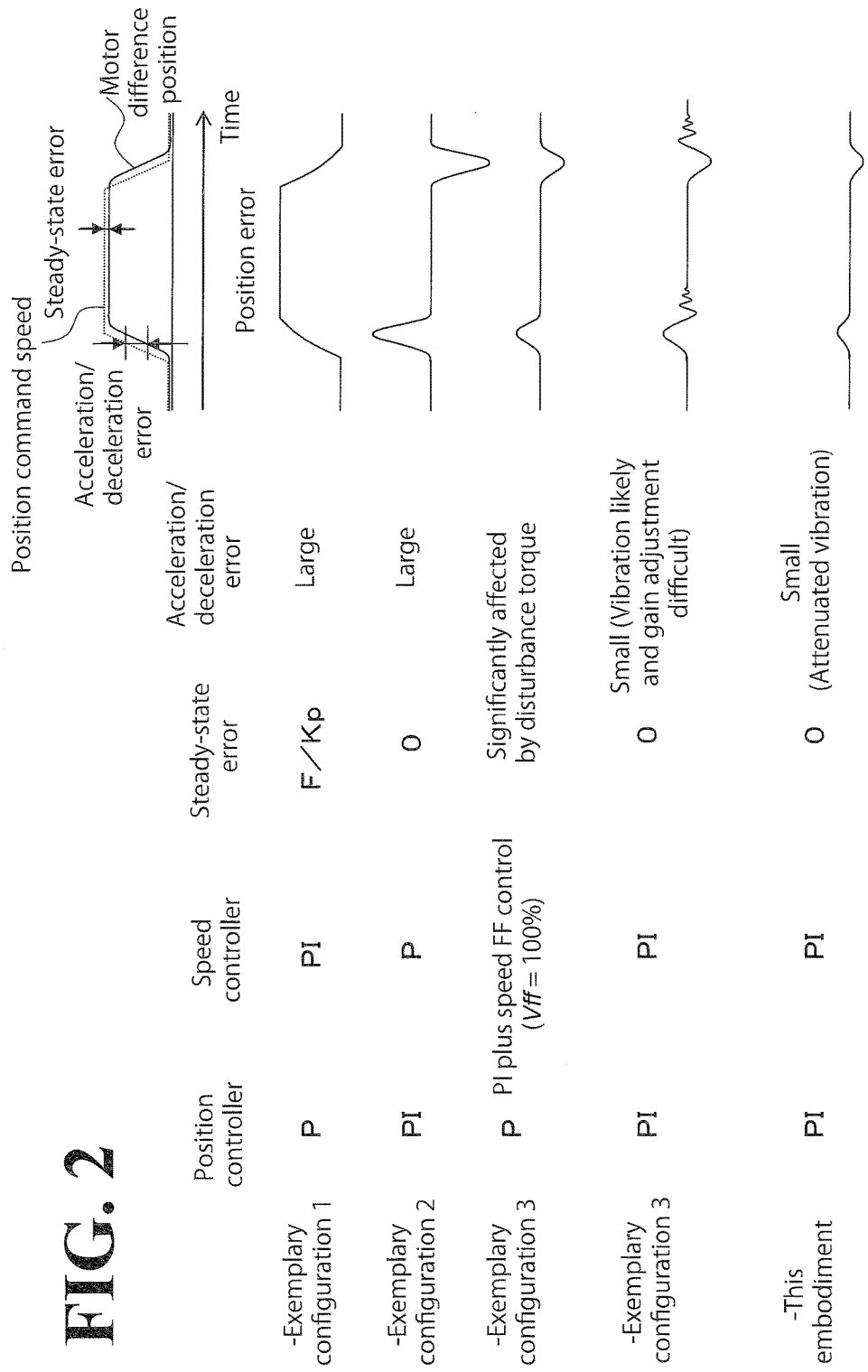
FIG. 2 is a diagram illustrating a comparison of errors corresponding to respective control configurations.

For example, as in exemplary configuration 1 illustrated in FIG. 2, the position controller 1 may include a proportioner, and the speed controller 2 may include a proportioner and an integrator so as to perform what is called position-P-speed-PI control. In this case, even though the speed error is made close to 0, the position error occurs on a large scale both in the acceleration/deceleration error and the steady-state error.

Alternatively, as in exemplary configuration 2 illustrated in FIG. 2, the position controller 1 may include a proportioner and an integrator, and the speed controller 2 may include a proportioner so as to perform what is called position-PI-speed-P control. In this case, even though the steady-state error is made close to zero, the acceleration/deceleration error remains large.

Alternatively, as in exemplary configuration 3 illustrated in FIG. 2, the position controller 1 may include a proportioner, and the speed controller 2 may include a proportioner and an integrator so as to perform what is called position-P-speed-PI control. In addition, speed feed-forward control is performed with a speed feed-forward gain $V_{ff}$ of 1 (=100%). This case exhibits errors approximate to the errors in exemplary configuration 2. However, the errors are likely to increase due to disturbance.

In order to reduce occurrence of the position error, as described above, this embodiment has what is called a double integral configuration, in which both the position controller 1 and the speed controller 2 include an integrator. In order to suppress vibration at the time when motor operation ends, in particular, an imperfect integrator is used as the integrator of the position controller 1. This embodiment also takes into consideration balance adjustment of the gains to suppress occurrence of vibration in the case of the double integral configuration. In order to further reduce the position error, torque feed-forward control in consideration of viscous friction of the motor M is also performed. These features of this embodiment and the configuration to implement the features will be described below. Analytic Investigation of Double Integral Configuration In the case of the position-P-speed-PI control, as in exemplary configuration 3, the steady-state error (PosErr) is represented by the following Formula (1) based on a known final-value theorem:

$$PosErr = \frac{1}{\frac{K_p}{1 - V_{ff}}} \qquad (1)$$

Referring to Formula (1), when the speed feed-forward coefficient $V_{ff}$=100%, the position error becomes asymptotically close to 0. It is, however, only "asymptotically", and the position error does not become strictly 0.

In order to make the position error strictly 0 with a simplest dual loop configuration, the position integrator 11 may be incorporated in the position control loop. For example, in the position-PI-speed-P control configuration, as in exemplary configuration 2, the transfer function from the position command to the position error is represented by the following Formula (2):

$$\frac{K_p K_v s + \frac{K_p K_v}{T_{pi}}}{s^3 + K_v s^2 + K_p K_v s + \frac{K_p K_v}{T_{pi}}} \cdot \frac{T_{pi} s^2 (s + K_v)}{K_p K_v (1 + T_{pi} s)} \quad (2)$$

Assuming a ramp command as the position command to be input and applying the final-value theorem result in the following:

$$\lim_{s \to \infty} s \cdot \frac{1}{s^2} \cdot \frac{K_p K_v s + \frac{K_p K_v}{T_{pi}}}{s^3 + K_v s^2 + K_p K_v s + \frac{K_p K_v}{T_{pi}}} \cdot \frac{T_{pi} s^2 (s + K_v)}{K_p K_v (1 + T_{pi} s)} = 0 \quad (3)$$

Formula (3) indicates that incorporating the position integrator 11 in the position control loop to perform PI control ensures that the steady-state error becomes strictly 0.

Figure 3:
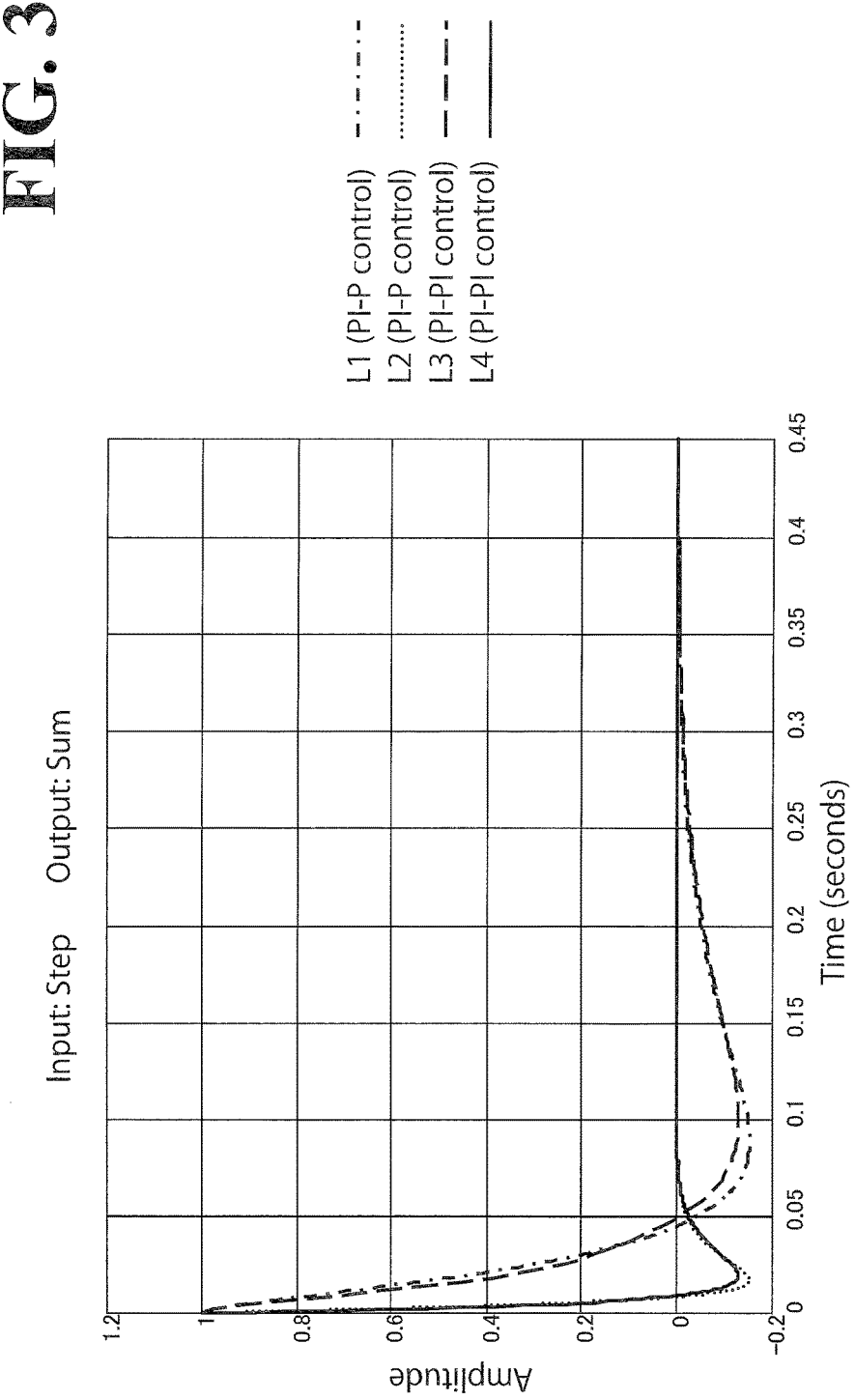
FIG. 3 illustrates a graph of step responses in double integral configurations.

Next, the maximum position error in a transitional state will be investigated. Lines L1 and L2 in FIG. 3 are plotted waveforms of position errors in a case of stepped position commands being input to a comparative example (which corresponds to exemplary configuration 2) that has a dual loop configuration of position-PI-speed-P control. Gain setting values corresponding to the respective lines L1 and L2 are listed in FIG. 5.

Formula (2) indicates that when the position control loop includes the PI controller, a zero point exists in the transfer function from the position command to the position error, which results in liability to overshoot. Actually, overshoots are observed from lines L1 and L2 in FIG. 3. From a view of mechanical control, however, it is desirable to minimize the amount of overshoot.

In view of this situation, one measure to decrease the overshoot in this embodiment is to incorporate the speed integrator 12 in the speed control loop. That is, this embodiment provides the double integral configuration having the position control loop and the speed control loop, and makes the response frequency of the speed integrator 12 sufficiently larger than the response frequency of the position integrator 11. This configuration makes the speed error larger than the position error.

Lines L3 and L4 in FIG. 3 indicate position errors in a case of stepped position commands being input to a dual loop configuration of the position-PI-speed-PI control similar to this embodiment. Gain setting values corresponding to the respective lines L3 and L4 in this case are listed in FIG. 5. FIG. 3 indicates that the addition of the speed integrator 12 decreases, though slightly, the overshoot amount.

Figure 4:
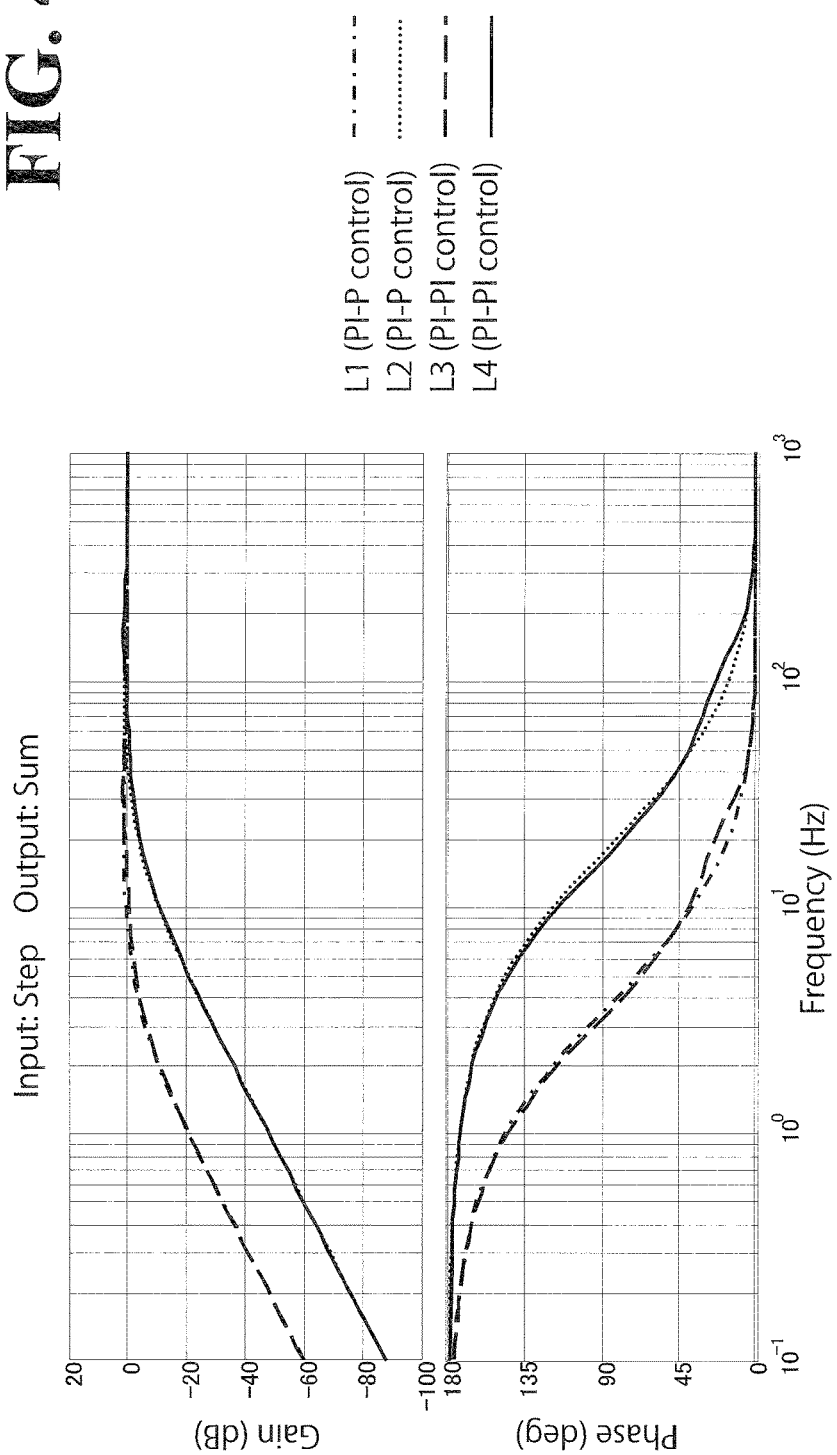
FIG. 4 is a Bode diagram in the double integral configurations.

FIG. 4 is a Bode diagram from the position command to the position error under the conditions illustrated in FIG. 3. Lines L1 to L4 respectively correspond to lines L1 to L4 in FIG. 3. FIG. 4 indicates that the addition of speed integral causes the phase of 10 Hz to 30 Hz to proceed when $K_v$=40 Hz and causes the phase of 60 Hz to 200 Hz to proceed when $K_v$=200 Hz. This property contributes to decreasing the overshoot.

Based on the above-described investigation, in the motor controller 100 according to this embodiment, the position integrator 11 of the position controller 1 calculates an integral value of the position error by an integral section ($1/T_{pi\text{-}s}$), which includes a time constant $T_{pi}$, and adds the integral value to the position error. Also, the speed integrator 12 of the speed controller 2 calculates an integral value of the speed error by an integral section ($1/T_{i\text{-}s}$), which includes a time constant $T_i$, and adds the integral value to the speed error. It is noted that the time constant $T_{pi}$ of the position integrator 11 corresponds to the first time constant recited in the claims, and that the time constant $T_i$ of the speed integrator 12 corresponds to the second time constant recited in the claims.

Application of Imperfect Integral in Position Controller

Figure 6:
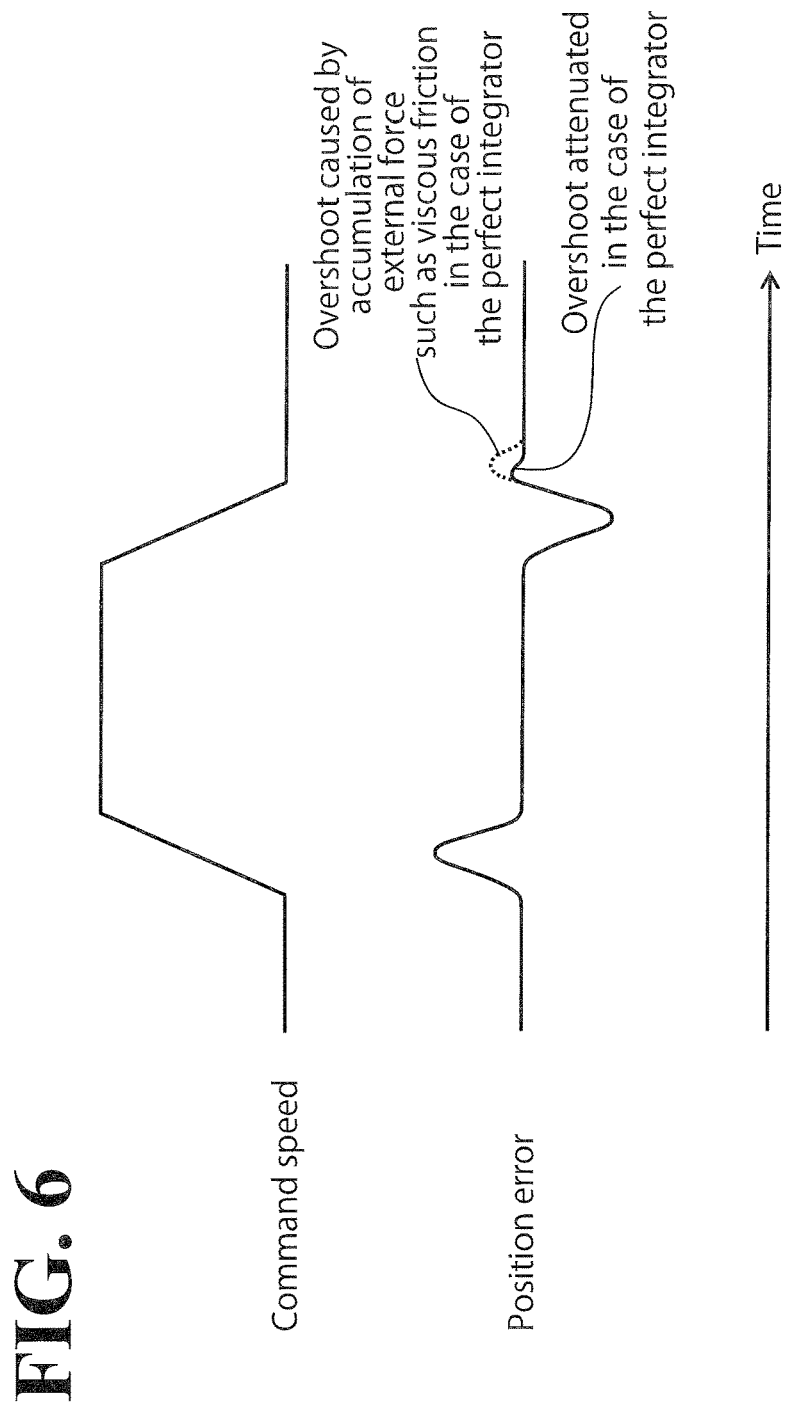
FIG. 6 is a diagram illustrating overshoots caused by a position integrator.

Another measure to decrease the overshoot will be investigated. As described above, the overshoot is caused by the addition of the integrator having a zero point to the position control loop. In other words, the overshoot does not occur if the integrator causing the zero point is eliminated. Specifically, in the integral control (I control) by the position controller 1, at the end of the input of the position command, particularly when the motor M is stopped at the end of deceleration, the motor position overshoots from the command stop position to induce vibration, as illustrated in FIG. 6. During this vibration, a position error may occur. The occurrence of the position error is because the response of the integrator itself is slow. In other words, the occurrence of the position error is because even after the input value becomes 0, the output value remains in the integrator for a while.

Based on the above-described factors, in this embodiment, the position integrator 11 includes an imperfect integration function. Imperfect integration is to multiply the output of an integrator by a coefficient and perform negative feedback of the product to the input of the integrator so as to gradually decrease the integral output as a result. Specifically, in this embodiment, the position integrator 11 includes an imperfect integrator to multiply the output (integral value of the position error) of the integral section ($1/T_{pi\text{-}s}$) of the position integrator 11 by an imperfect integral gain $D_p$, and perform negative feedback of the product to the input of the integral section (see FIG. 1).

Figure 7:
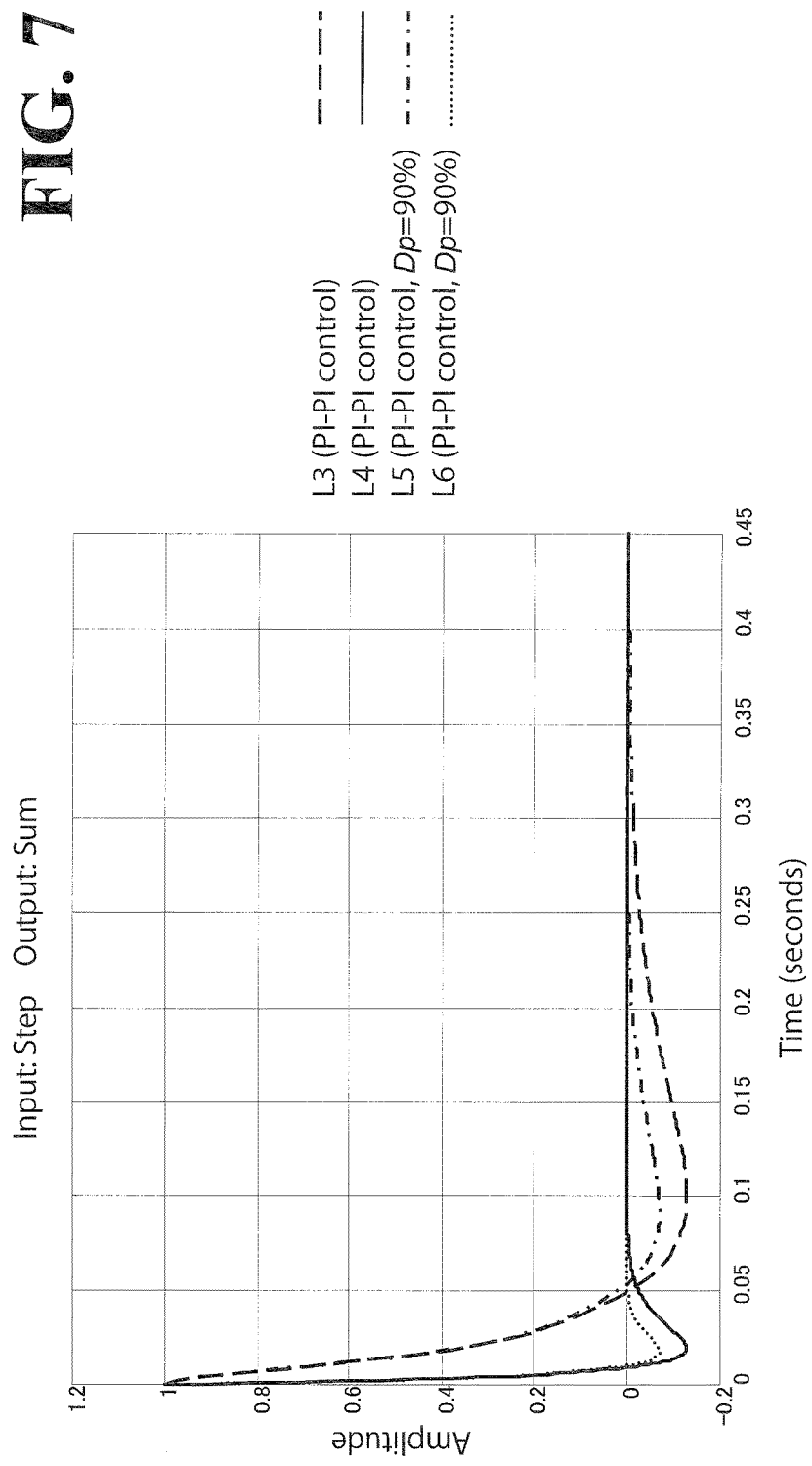
FIG. 7 illustrates a graph of step responses in a case where an imperfect integral is applied to the position integrator.

Lines L5 and L6 in FIG. 7 are plotted waveforms of position errors in a case of stepped position commands being input in position-PI-speed-PI control, which is equivalent to this embodiment, and in a case of 90% imperfect integral ratio being set to the position integrator 11 in the position-PI-speed-PI control. The gain setting values in lines L5 and L6 are identical to the gain setting values in the case of lines L3 and L4 in FIG. 5, except the imperfect integral gain $D_p$. Lines L3 and L4 in FIG. 7 respectively correspond to lines L3 and L4 in FIG. 3. It is noted that 90% imperfect integral ratio indicates that 90% of the output from the integral section is subtracted from the integral value. FIG. 7 indicates that the imperfect integral decreases the overshoot, even though the attenuation curves are approximately the same while the position errors are on the decrease.

Figure 8:
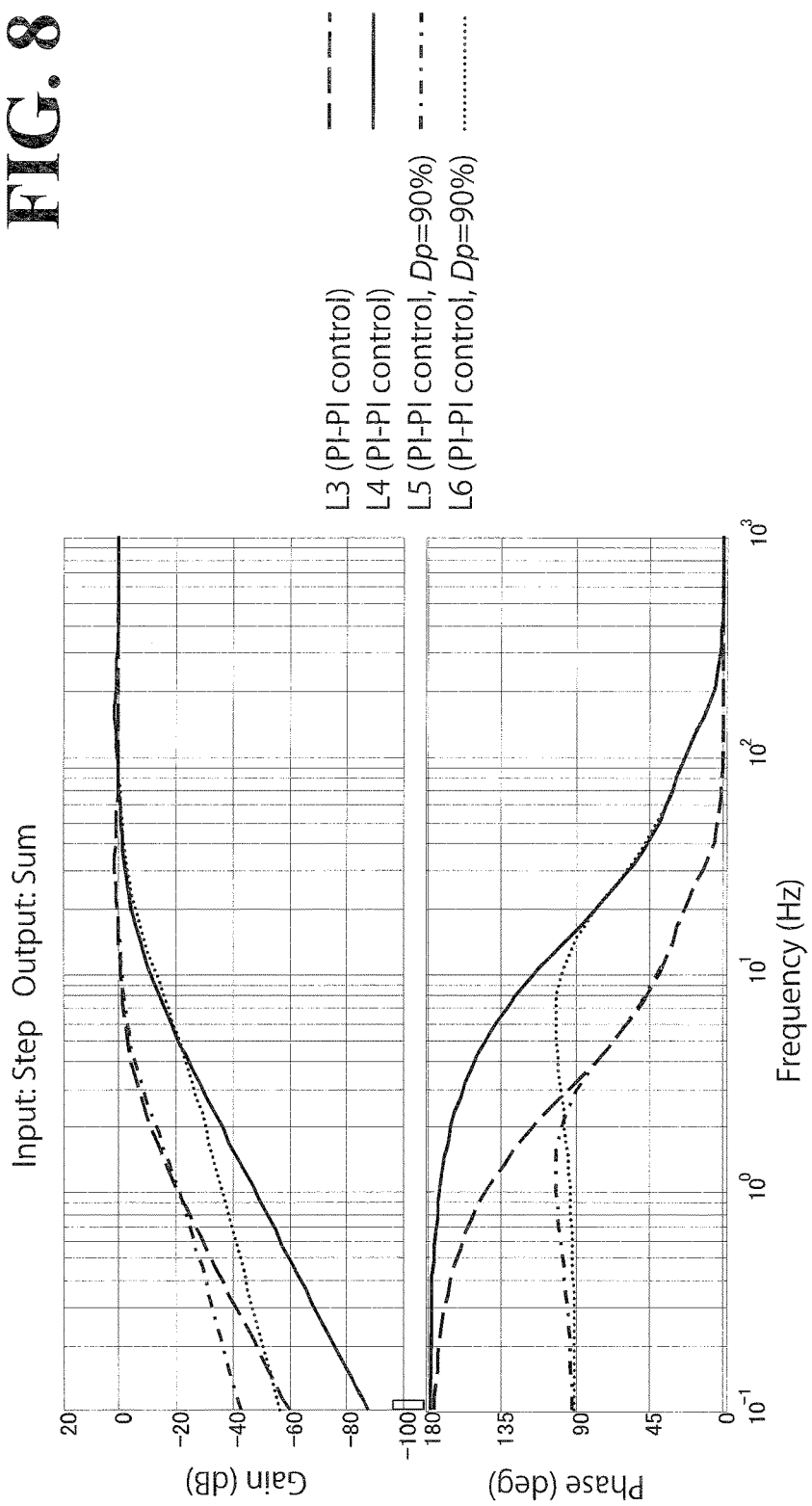
FIG. 8 is a Bode diagram in the case where an imperfect integral is applied to the position integrator.

FIG. 8 is a Bode diagram from the position command to the position error under the conditions of FIG. 7. The lines in FIG. 8 are identical to the lines in FIG. 7. FIG. 8 indicates that the addition of the imperfect integral results in such changes in the gain and the phase of the low frequency band that as the frequency decreases, the position integration becomes less effective.

Feed-Forward Control

The feed-forward control according to this embodiment includes speed feed-forward control performed simply based on a first-order differential value of a position command, and torque (acceleration rate) feed-forward control performed based on a second-order differential value of the position command. In the speed feed-forward control, the configuration illustrated in FIG. 1 is used as it is; that is, a speed-equivalent value, which is a first-order differential value of the position command, is multiplied by the feed-forward gain $V_{ff}$, and the product is added to the speed command.

In the torque feed-forward control, basically, a torque-equivalent value, which is a second-order differential value of the position command, is multiplied by a total moment of inertia $J_0$ and a torque feed-forward gain $T_{ff}$, and the product is added to the torque command. In order to eliminate or minimize the influence of mechanical looseness and static friction, a preferable configuration not illustrated is to set torque feed-forward gains $T_{ff}$ individually in normal and reverse directions.

Figure 9:
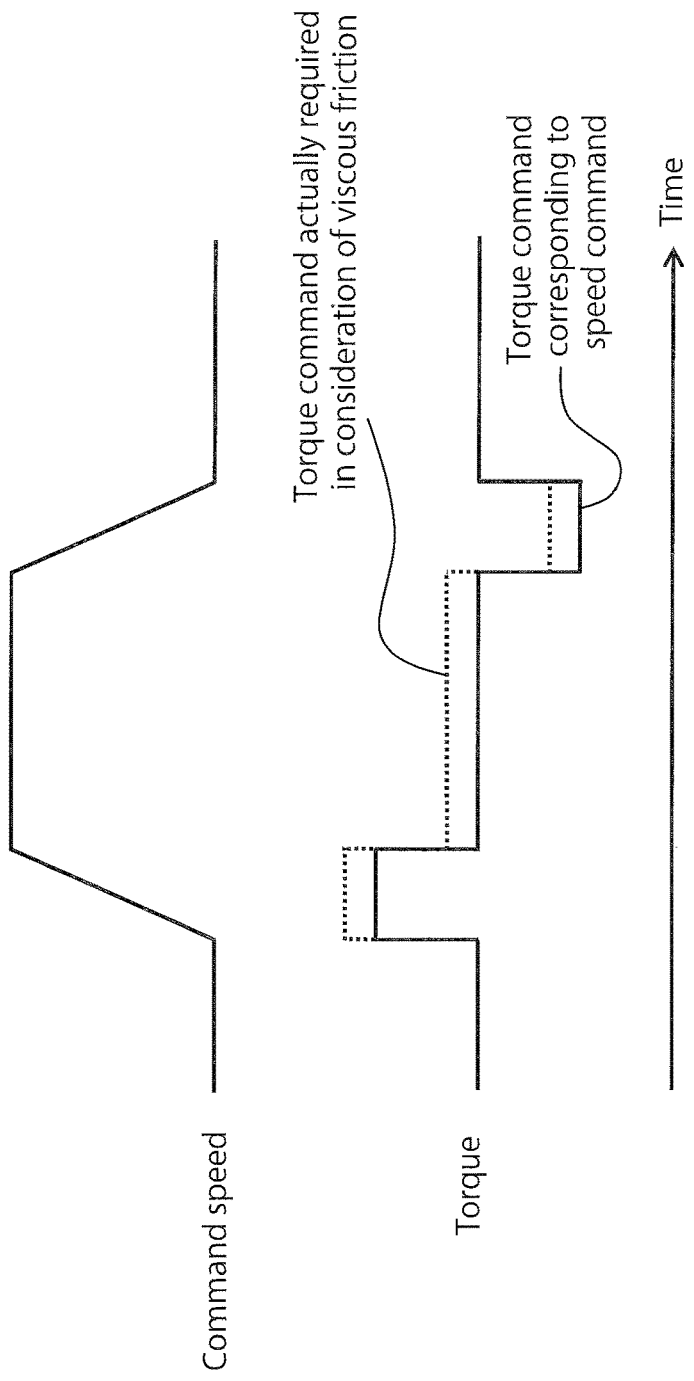
FIG. 9 illustrates a torque graph in consideration of an amount corresponding to viscous friction.

In this embodiment, in order to eliminate or minimize the influence of viscous friction, the speed-equivalent value (first-order differential), which is based on the position command, is multiplied by a viscous friction compensation coefficient $D_{comp}$, and the product is added to the torque feed-forward command, as illustrated in FIG. 1. This configuration is a measure taken for the following reason. As described above, a component of the position error that cannot be decreased by proportional control by the proportioner is decreased by integral control by the integral section. The component of the position error is significantly affected mainly by factors such as disturbance torque due to the inherent viscous friction of the motor M, which is a control target. For example, as illustrated in FIG. 9, in order to actually make the motor position follow the position command, it is necessary to constantly input a torque command that is higher than the torque command that is based on the position command by an amount corresponding to the disturbance torque caused by the viscous friction. The disturbance torque caused by the viscous friction is equal to a value obtained by multiplying the motor speed by an inherent viscous friction coefficient D of the motor M.

In view of this situation, in this embodiment, the torque feed-forward controller 5 multiplies a torque-equivalent value, which is a second-order differential value of the position command, by the total moment of inertia $J_0$ of the motor M so as to obtain a first product. Then, the torque feed-forward controller 5 multiplies a speed-equivalent value, which is a first-order differential value of the position command, by the viscous friction compensation coefficient $D_{comp}$ of the motor M so as to obtain a second product (which is equivalent to the above-described amount corresponding to disturbance torque). Then, the torque feed-forward controller 5 adds the second product to the first product and multiplies the sum by the torque feed-forward gain $T_{ff}$ so as to generate a torque feed-forward command. Then, the torque feed-forward controller 5 performs the torque feed-forward control by adding the torque feed-forward command to the torque command.

Gain Balance

Next, gain balance between feedback gains in the motor controller 100 according to this embodiment illustrated in FIG. 1 will be investigated, and investigated gain setting values will be checked as to stability. A basic concept of the gain balance is that formulae are made in which a secondary attenuation coefficient based on speed loop gain as a reference is equal to 1. It is noted that for the time constant $T_i$ alone, because of the employment of the speed integrator 12, the attenuation coefficient is made to be approximately 0.7 to minimize the time constant $T_i$.

Specifically, the following Formulae (4) to (6) are used.

$$K_p = \frac{K_v}{2\pi} \qquad (4)$$

$$T_{pi} = \frac{4}{K_p} \qquad (5)$$

$$T_i = \frac{2}{K_v} \qquad (6)$$

Next, stability of the control block illustrated in FIG. 1 with respect to the above Formulae will be investigated. In FIG. 1, to facilitate understanding, assume that the viscous friction coefficient D of the motor $M=D_{comp}=0$, and that a rotor moment J including a rotation axis of the motor M=the total moment of inertia $J_0=1$. In this case, the transfer function from the position command to the motor position is represented by the following Formula (7):

$$\frac{b_5 s^5 + b_4 s^4 + b_3 s^3 + b_2 s^2 + b_1 s + b_0}{s^6 + a_5 s^5 + a_4 s^4 + a_3 s^3 + a_2 s^2 + a_1 s + a_0} \qquad (7)$$

where $$a_5 = \frac{1}{T} + \frac{1}{T_f} + \frac{D_p}{T_{pi}}$$

$$a_4 = \left(\frac{1}{T} + \frac{1}{T_f}\right)\frac{D_p}{T_{pi}} + \left(K_v + \frac{1}{T}\right)\frac{1}{T_f}$$

$$a_3 = \frac{D_p}{T_f T_{pi} T} + \left(\frac{1}{T} + \frac{D_p}{T_{pi}} + \frac{1}{T_i} + K_p\right)\frac{K_v}{T_f}$$

$$a_2 = \left(\frac{D_p}{T} + \frac{D_p}{T_i} + D_p K_p + K_p\right)\frac{K_v}{T_f T_{pi}} + \left(\frac{1}{T} + K_p\right)\frac{K_v}{T_f T_i} + \frac{K_p K_v}{T_f T}$$

$$a_1 = \left(\frac{D_p}{T_{pi} T} + \frac{K_p}{T} + \frac{D_p K_p}{T_{pi}} + \frac{K_p}{T_{pi}}\right)\frac{K_v}{T_f T_i} + (D_p + 1)\frac{K_p K_v}{T_f T_{pi} T}$$

$$a_0 = (D_p + 1)\frac{K_p K_v}{T_f T_i T_{pi} T}$$

$$b_5 = \frac{T_{ff}}{T}$$

$$b_4 = \left(\frac{D_p}{T_{pi}} + \frac{1}{T_f}\right)\frac{T_{ff}}{T} + \frac{K_v V_{ff}}{T_f}$$

$$b_3 = \frac{D_p T_{ff}}{T_f T_{pi} T} + \left(\frac{1}{T} + \frac{D_p}{T_{pi}} + \frac{1}{T_i}\right)\frac{K_v V_{ff}}{T_f} + \frac{K_p K_v}{T_f}$$

$$b_2 = \left(\frac{D_p}{T_{pi} T} + \frac{1}{T_i T} + \frac{D_p}{T_i T_{pi}}\right)\frac{K_v V_{ff}}{T_f} + (D_p + 1)\frac{K_p K_v}{T_f T_{pi}} + \left(\frac{1}{T} + \frac{1}{T_i}\right)\frac{K_p K_v}{T_f}$$

$$b_1 = \frac{D_p K_v V_{ff}}{T_f T_i T_{pi} T} + (D_p + 1)\left(\frac{1}{T} + \frac{1}{T_i}\right)\frac{K_p K_v}{T_f T_{pi}} + \frac{K_p K_v}{T_f T_i T}$$

$$b_0 = (D_p + 1)\frac{K_p K_v}{T_f T_i T_{pi} T}$$

Figure 10:
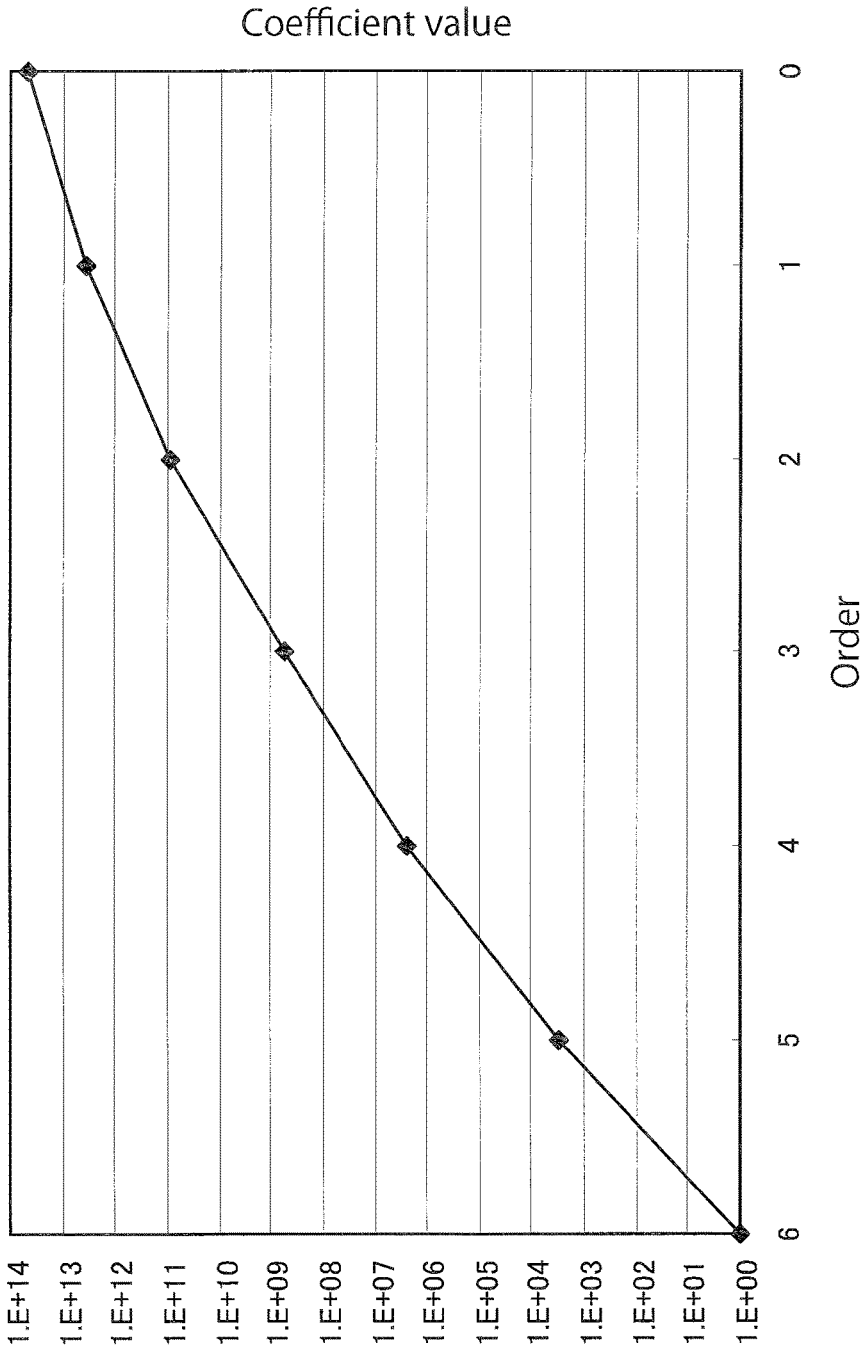
FIG. 10 illustrates a coefficient graph of gain stability in a case where $2\pi \times 40$ is substituted for a speed control gain.
Figure 11:
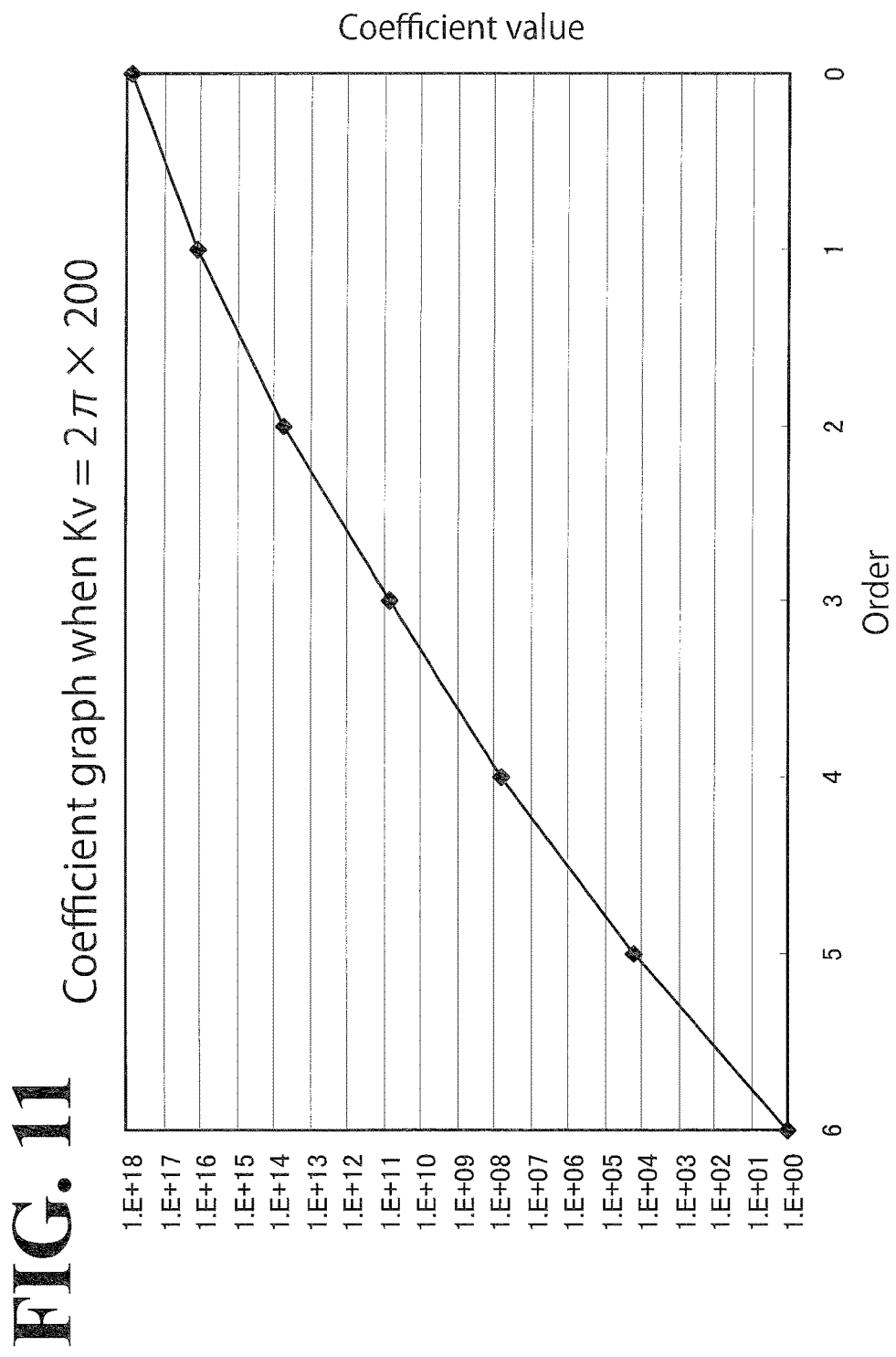
FIG. 11 illustrates a coefficient graph of gain stability in a case where $2\pi \times 200$ is substituted for the speed control gain.

FIG. 10 illustrates a coefficient graph of Formula (7) with $K_v=2\pi \times 40$ substituted into Formulae (4) to (6). FIG. 11 illustrates a coefficient graph with $K_v=2\pi \times 200$ substituted into Formulae (4) to (6). These cases are under the assumption that imperfect integral gain $D_p=10\%$. FIGS. 10 and 11 indicate that both cases satisfy a stability sufficient condition according to the known Lipatov stability criterion. In order to reduce the overshoot, it is also effective to simply set parameters to satisfy the following relationships simultaneously: relationship where the position control gain $K_p$ is approximately proportionate to the speed control gain $K_v$; relationship where the time constant $T_{pi}$ of the position integrator 11 is approximately inversely proportionate to the position control gain $K_p$; and relationship where the time constant $T_i$ of the speed integrator 12 is approximately inversely proportionate to the speed control gain $K_v$.

Confirmation of Effects by Simulation

Figure 12:
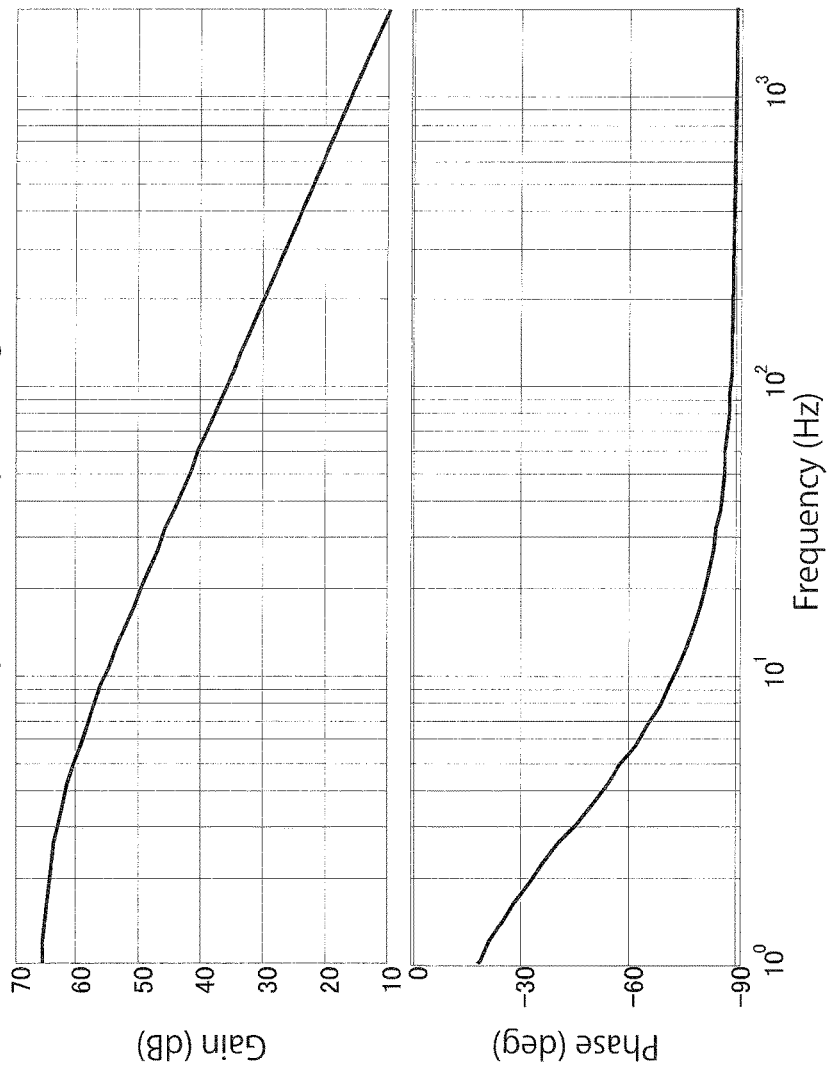
FIG. 12 is a Bode diagram of a control target applied to response simulation in the embodiment.
Figure 13:
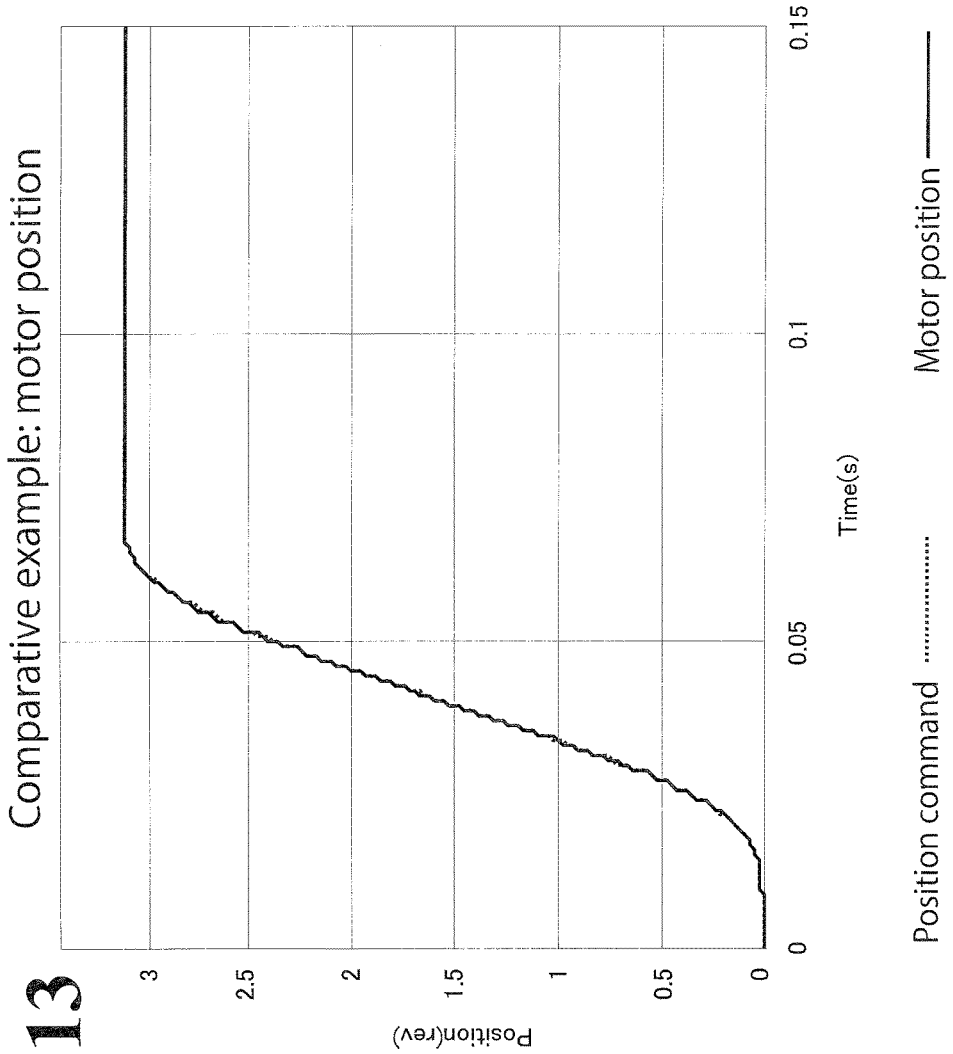
FIG. 13 illustrates a graph of a simulation result of an output position in a comparative example.
Figure 14:
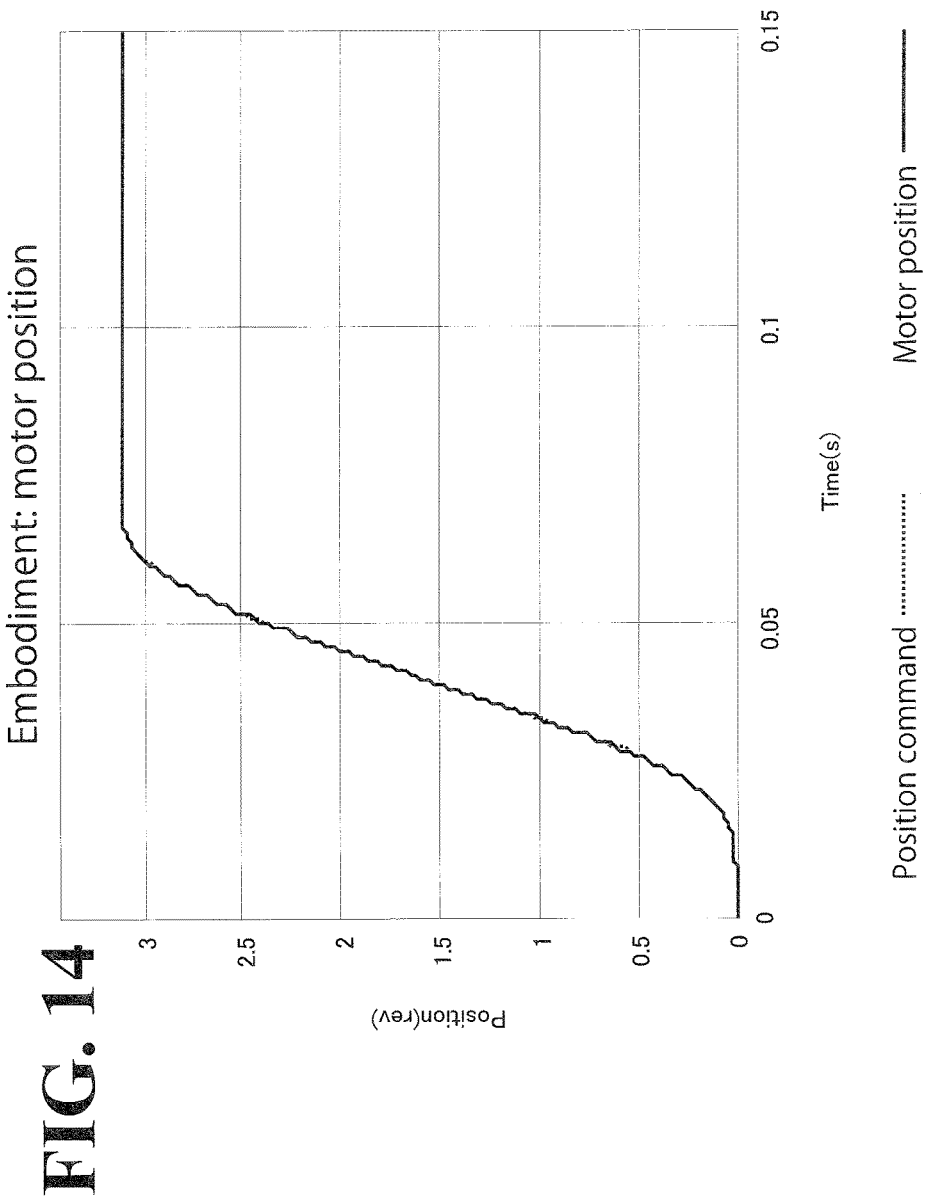
FIG. 14 illustrates a graph of a simulation result of an output position in the embodiment; example.
Figure 15:
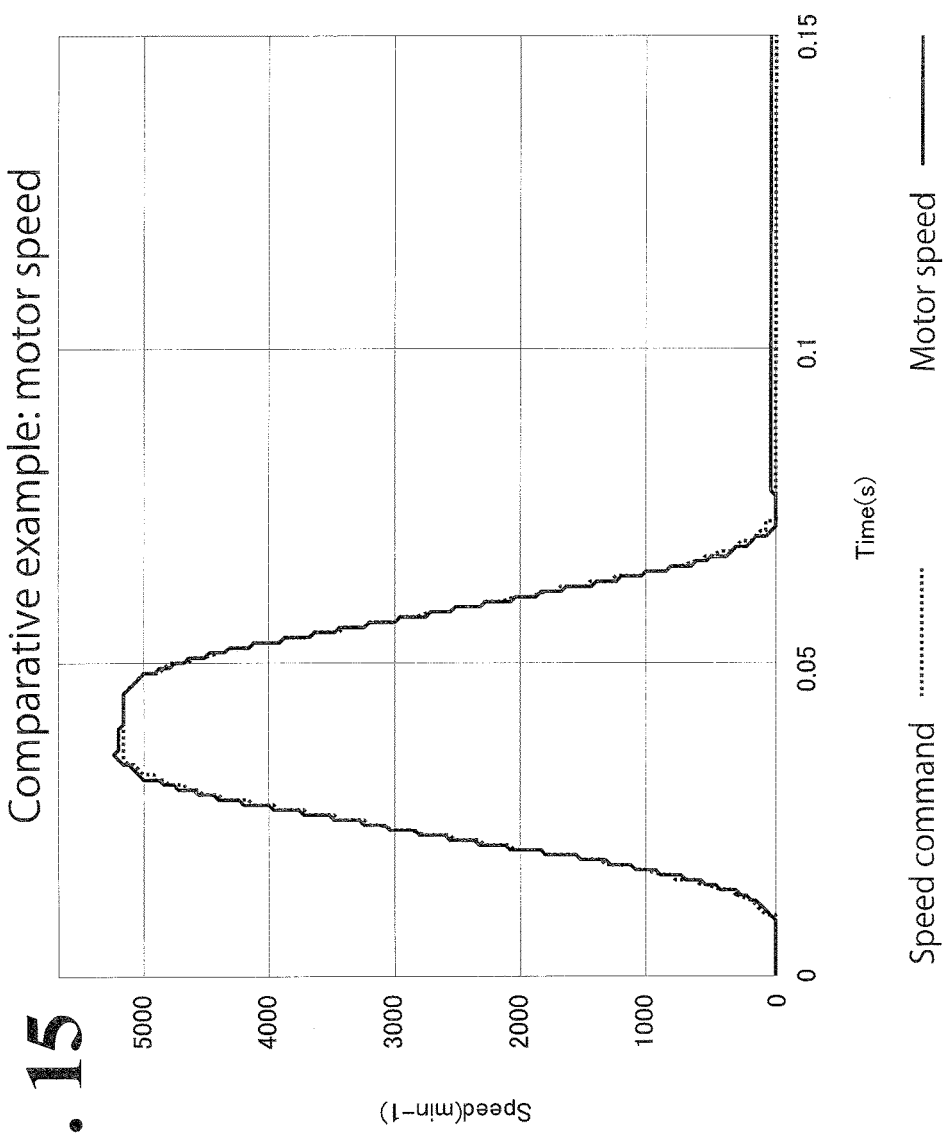
Figure 16:
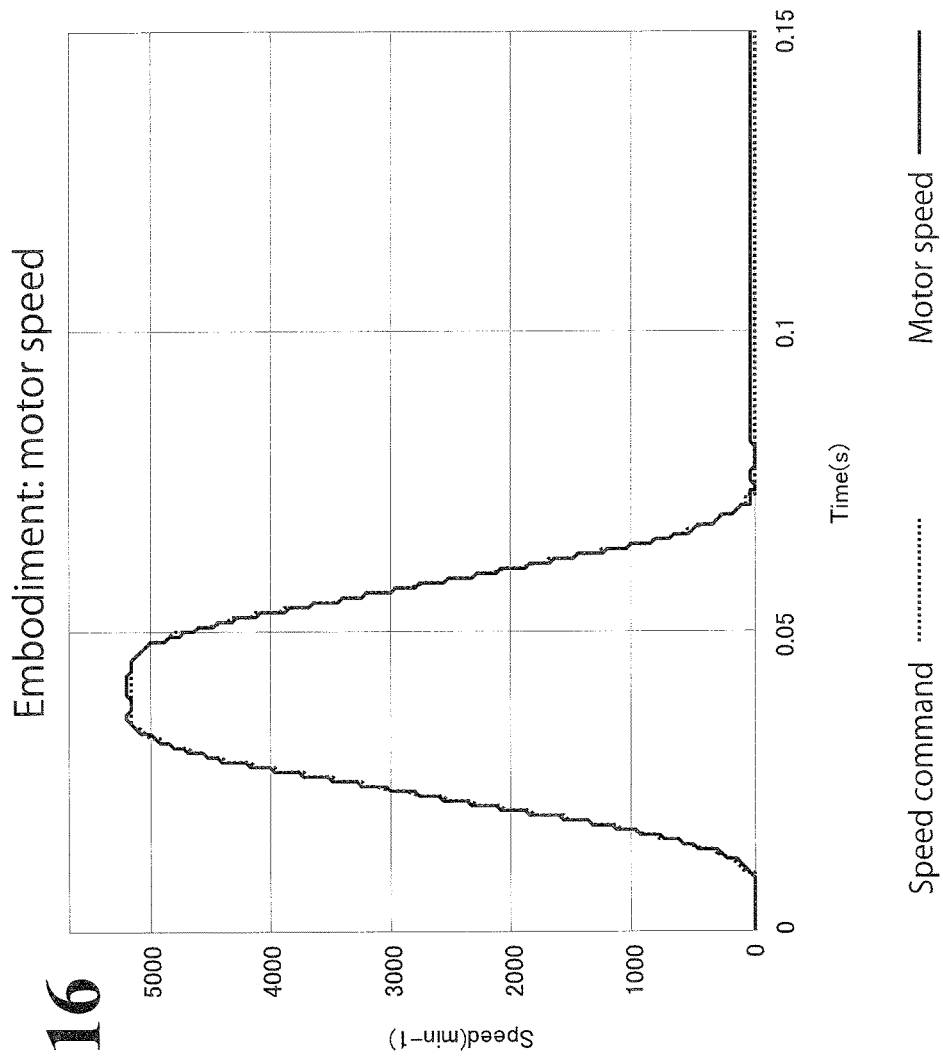
FIG. 16 illustrates a graph of a simulation result of an output speed in the embodiment.
Figure 17:
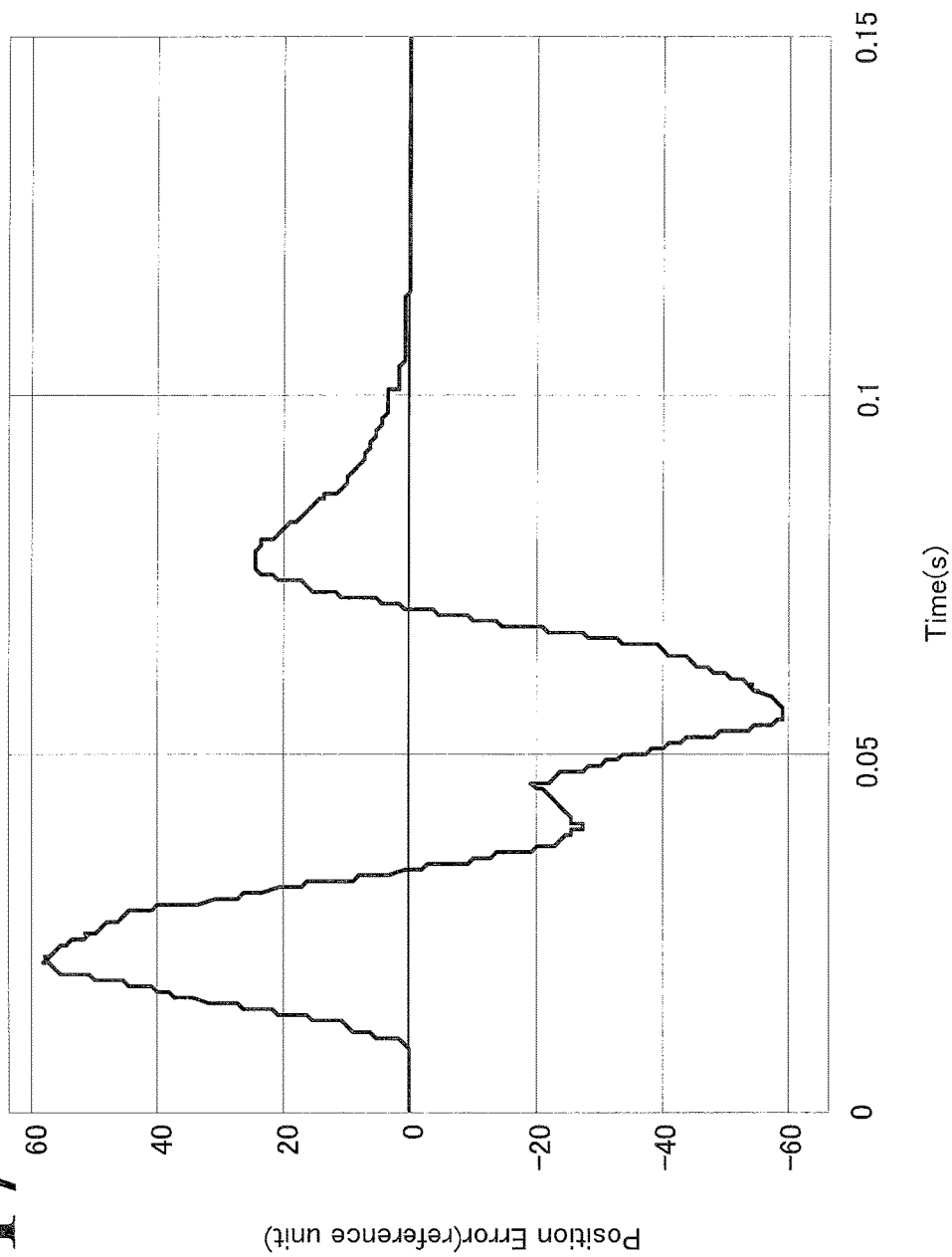
FIG. 17 illustrates a graph of a simulation result of a position error in the comparative example.
Figure 18:
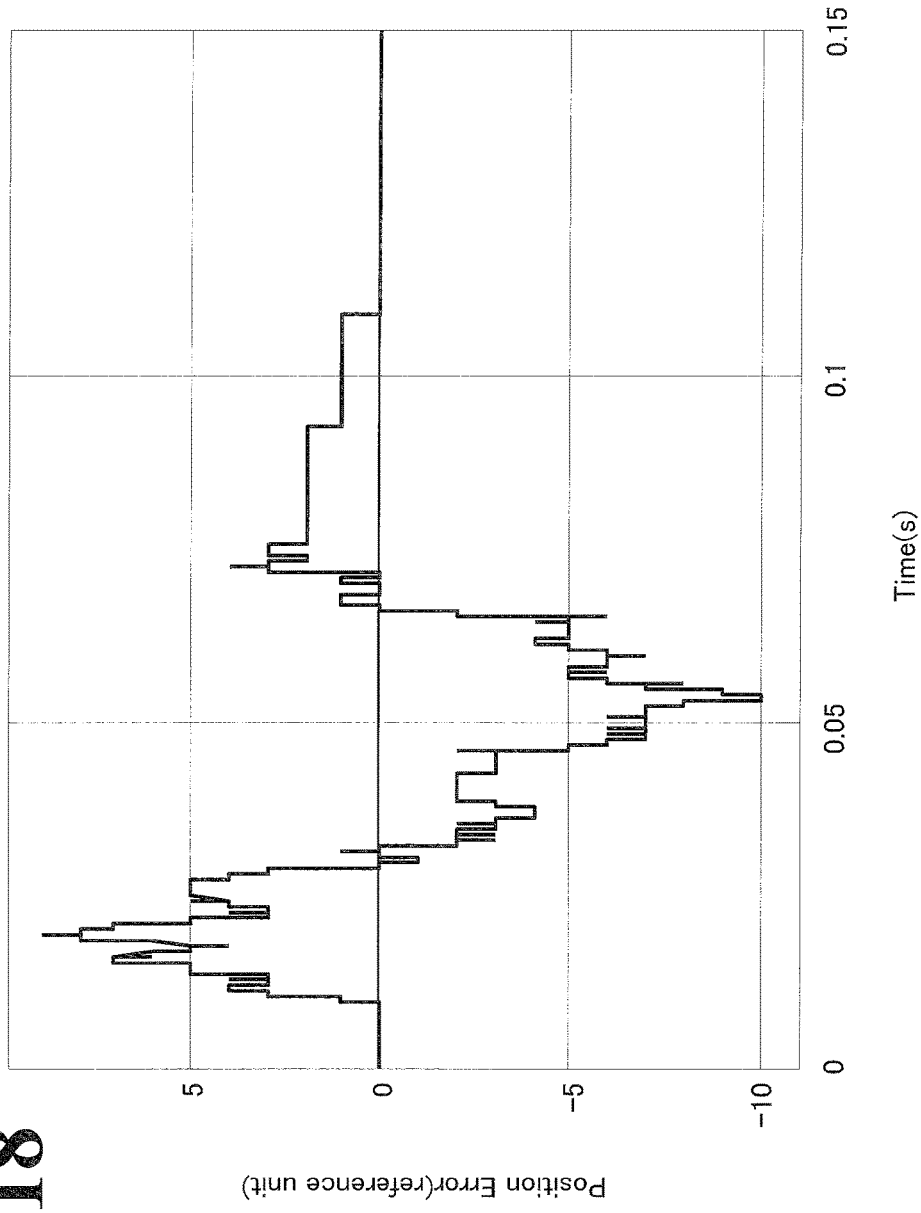
FIG. 18 illustrates a graph of a simulation result of a position error in the embodiment.
Figure 19:
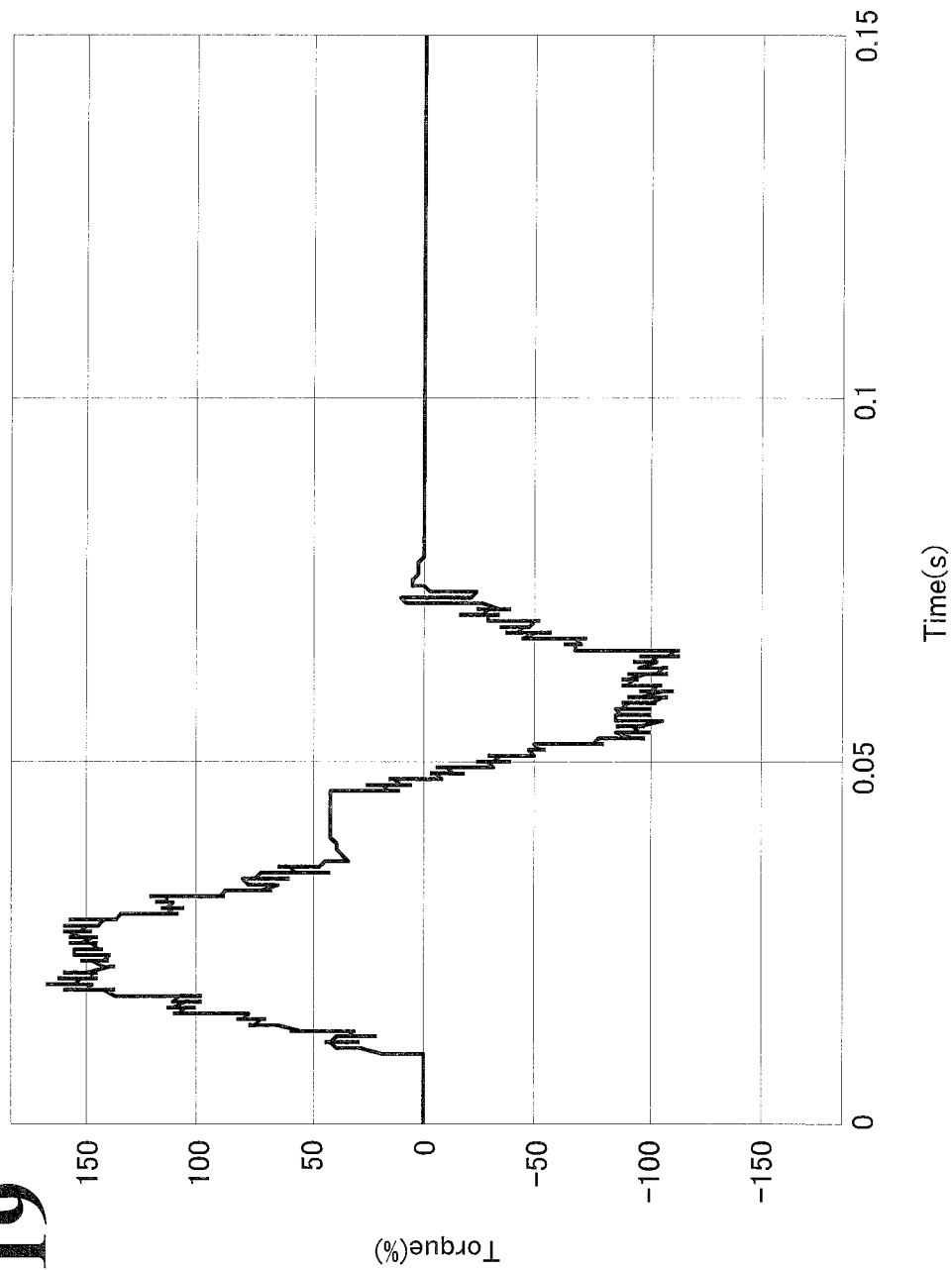
FIG. 19 illustrates a graph of a simulation result of a torque command in the comparative example.
Figure 20:
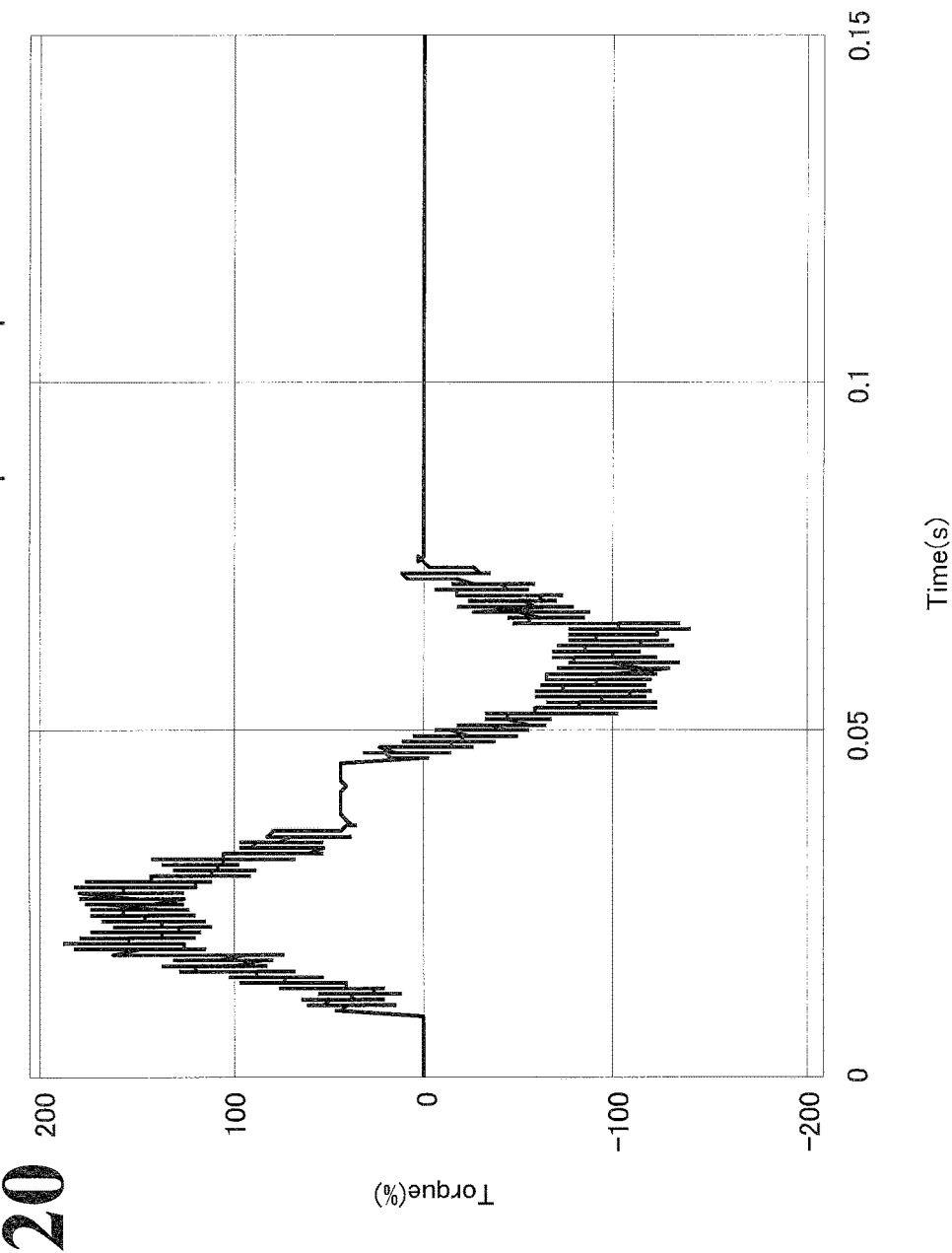
FIG. 20 illustrates a graph of a simulation result of a torque command in the embodiment.

Response by the motor controller 100 according to this embodiment will now be checked by simulation. For comparison purposes, the following description will also refer to a simulation result of the position-P-speed-PI control plus speed feed-forward control ($V_{ff}=100\%$) in exemplary configuration 3. FIG. 12 illustrates a frequency property of a control target model used in this simulation. FIGS. 13, 15, 17, and 19 illustrate responses in cases of exemplary configuration 3 being applied to the control target model having the frequency property illustrated in FIG. 12. FIGS. 14, 16, 18, and 20 illustrate responses in cases of the motor controller 100 according to this embodiment being applied to the control target model having the frequency property illustrated in FIG. 12. FIGS. 13 and 14 illustrate the position commands and the motor positions. FIGS. 15 and 16 illustrate the speed command values and the motor speeds. FIGS. 17 and 18 illustrate the position errors. FIGS. 19 and 20 illustrate the torque commands. Parameters applied to the configurations are listed in FIG. 21.

As compared with FIG. 17, FIG. 18 shows a lower maximum position error. Moreover, similarly to FIG. 17, FIG. 18 shows no overshoot of the position error at the time of completion of issuing the position command (at the end of input of the position command). It is judged from these observations that intended performance is obtained.

Advantageous Effects of this Embodiment

The above-described embodiment provides the following advantageous effects. The motor controller 100 according to this embodiment includes the position integrator 11, which serves as an integral section in the position controller 1, and the speed integrator 12, which serves as an integral section in the speed controller 2. That is, both the position controller 1 and the speed controller 2 include integrators. Thus, both the position controller 1 and the speed controller 2 in the dual feedback loop perform the double integral control. This configuration ensures that even under an influence of disturbance torque or any other occurrence, not only the speed error but also the position error is made close to 0 with higher accuracy. This enables the motor controller 100 to reduce the position error. In particular, this embodiment provides a feedback-centered control configuration, and this configuration is advantageous in that the motor controller 100 is less likely to be influenced by deterioration over time of machines or by individual differences of the machines.

In particular, in this embodiment, the position integrator 11 of the position controller 1 is an imperfect integrator to multiply an integral value of the position error by the imperfect integral gain $D_{comp}(<1)$ and to perform negative feedback of the product to the input of the position integrator 11. Thus, after the input of the position command ends and the input value (position error in this case) temporarily becomes close to 0, the output value of the imperfect integrator spontaneously decreases gradually over time. This configuration reduces vibration caused by the overshoot, and thus eliminates or minimizes the position error.

It is noted that even though the position integrator 11 of the position controller 1 is an imperfect integrator, the speed integrator 12 of the speed controller 2 makes the speed error at the time of acceleration or deceleration close to 0. Consequently, no or minimal degradation occurs in the dual feedback loop configuration as a whole. That is, the position controller 1 including the imperfect integrator and the speed controller 2 including the perfect integrator is a particularly suitable combination of functions to implement error-less control in the dual feedback loop configuration.

In particular, in this embodiment, the position controller 1 adds the output of the position integrator 11 to the position error and multiplies the sum by the position control gain $K_p$ to generate the speed command. The speed controller 2 adds the output of the speed integrator 12 to the speed error and multiplies the sum by the speed control gain $K_v$ to generate the torque command. Thus, both the position controller 1 and the speed controller 2 each include a proportioner and an integrator to implement the position-PI-speed-PI control. This configuration further reduces the position error, and implements the error-less control with higher accuracy.

In particular, in this embodiment, the position control gain $K_p$ and the speed control gain $K_v$ are approximately proportionate to each other. The time constant $T_{pi}$ of the position integrator 11 is approximately inversely proportionate to the position control gain $K_p$. The time constant $T_i$ of the speed integrator 12 is approximately inversely proportionate to the speed control gain $K_v$. In a conventional dual feedback loop configuration, when both a position controller 1 and a speed controller 2 included integrators, an imbalance occurred between the integrators and made vibration more likely to occur due to overshoot. This necessitated adjustment of the gains so as to suppress the vibration; however, the adjustment was complicated and difficult to perform. The inventors have conducted a study and found that setting the position control gain $K_p$, the speed control gain $K_v$, the time constant $T_{pi}$, and the time constant $T_i$ to satisfy the above-described relationships simultaneously reduces occurrence of the overshoot. This facilitates implementation of the error-less control by the double integral control using the position controller 1 and the speed controller 2.

In particular, in this embodiment, the position control gain $K_p$, the speed control gain $K_v$, the first time constant $T_{pi}$, and the second time constant $T_i$ are set to satisfy the following specific relationships (see Formulae (4), (5), and (6) above):

$$Kp \approx Kv/2\pi$$

$$Tpi \approx 4/Kp$$

$$Ti \approx 2/Kv$$

This configuration is a specific manner of implementing more highly accurate error-less control by the double integral control using the position controller 1 and the speed controller 2.

In particular, in this embodiment, the torque feed-forward controller 5 multiplies the torque-equivalent value, which is a second-order differential value of the position command, by the total moment of inertia $J_0$ of a control target of the motor M so as to obtain a first product. Then, the torque feed-forward controller 5 multiplies the speed-equivalent value, which is a first-order differential value of the position command, by the viscous friction compensation coefficient $D_{comp}$ of the control target so as to obtain a second product. Then, the torque feed-forward controller 5 adds the second product to the first product so as to generate the torque feed-forward command. Then, the torque feed-forward controller 5 performs the torque feed-forward control by adding the torque feed-forward command to the torque command. This configuration decreases the load of the integral control in each of the integrators and ensures more highly accurate and stable error-less control. It is noted that the torque feed-forward controller 5 is based on a feed-forward compensator that uses simple command differentiation. Meanwhile, the dual feedback loop itself has the error-less property. Consequently, the feed-forward controller may be provided as an auxiliary (to reduce the error amount at the time of acceleration/deceleration).

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A motor controller to control a motor, the motor controller comprising:
   a position controller configured to generate a speed command based on a position error between a position command and a motor position;
   a speed controller configured to generate a torque command based on a speed error between the speed command and a motor speed;
   a first integrator configured to calculate an integral value of the position error that is added to the position error by the position controller and multiply a resultant sum by a position control gain, the first integrator being configured to perform negative feedback to an input of the first integrator; and
   a second integrator configured to calculate an integral value of the speed error that is added to the speed error by the speed controller,
   wherein the motor controller is configured to output the torque command to the motor.

2. The motor controller according to claim 1, wherein the first integrator comprises an imperfect integrator configured to multiply the integral value of the position error by an imperfect integral gain and configured to perform the negative feedback with a resultant product to the input of the first integrator.

3. The motor controller according to claim 1,
   wherein the position controller is configured to multiply the resultant sum of the integral value of the position error that is added to the position error by the position control gain to generate the speed command, and
   wherein the speed controller is configured to multiply a resultant sum of the integral value of the speed error that is added to the speed error by a speed control gain so as to generate the torque command.

4. A motor controller to control a motor, the motor controller comprising:
   a position controller configured to generate a speed command based on a position error between a position command and a motor position;
   a speed controller configured to generate a torque command based on a speed error between the speed command and a motor speed;
   a first integrator configured to calculate an integral value of the position error that is added to the position error by the position controller and multiply a resultant sum by a position control gain; and
   a second integrator configured to calculate an integral value of the speed error that is added to the speed error by the speed controller,
   wherein the motor controller is configured to output the torque command to the motor,
   wherein the position controller is configured to multiply the resultant sum of the integral value of the position error that is added to the position error by the position control gain to generate the speed command,
   wherein the speed controller is configured to multiply a resultant sum of the integral value of the speed error that is added to the speed error by a speed control gain so as to generate the torque command,
   wherein the position control gain and the speed control gain are set to be approximately proportionate to each other,
   wherein a first time constant of the first integrator is set to be approximately inversely proportionate to the position control gain, and
   wherein a second time constant of the second integrator is set to be approximately inversely proportionate to the speed control gain.

5. The motor controller according to claim 1, further comprising a torque feed-forward controller configured to multiply a second-order differential value of the position command by a total moment of inertia of a control target of the motor so as to obtain a first product, configured to multiply a first-order differential value of the position command by a viscous friction compensation coefficient of the control target so as to obtain a second product, configured to add the second product to the first product so as to generate a torque feed-forward command, and configured to add the torque feed-forward command to the torque command.

6. A method for controlling a motor, the method comprising:
   generating a speed command based on a position error between a position command and a motor position;
   generating a torque command based on a speed error between the speed command and a motor speed;
   calculating an integral value of the position error;
   adding the integral value of the position error to the position error and multiplying a resultant sum by a position control gain;
   performing negative feedback to the position error;
   calculating an integral value of the speed error;
   adding the integral value of the speed error to the speed error; and
   outputting the torque command to the motor.

7. The motor controller according to claim 2, further comprising a torque feed-forward controller configured to multiply a second-order differential value of the position command by a total moment of inertia of a control target of the motor so as to obtain a first product, configured to multiply a first-order differential value of the position command by a viscous friction compensation coefficient of the control target so as to obtain a second product, configured to add the second product to the first product so as to generate a torque feed-forward command, and configured to add the torque feed-forward command to the torque command.

8. The motor controller according to claim 3, further comprising a torque feed-forward controller configured to multiply a second-order differential value of the position command by a total moment of inertia of a control target of the motor so as to obtain a first product, configured to multiply a first-order differential value of the position command by a viscous friction compensation coefficient of the control target so as to obtain a second product, configured to add the second product to the first product so as to generate a torque feed-forward command, and configured to add the torque feed-forward command to the torque command.

9. The motor controller according to claim 4, further comprising a torque feed-forward controller configured to multiply a second-order differential value of the position command by a total moment of inertia of a control target of the motor so as to obtain a first product, configured to multiply a first-order differential value of the position command by a viscous friction compensation coefficient of the control target so as to obtain a second product, configured to add the second product to the first product so as to generate a torque feed-forward command, and configured to add the torque feed-forward command to the torque command.

10. The motor controller according to claim 1, wherein the first integrator includes an integral section that calculates the integral value of the position error.

11. The motor controller according to claim 1, wherein the first integrator is configured to multiply the integral value of the position error by an imperfect integral gain.

12. A motor controller to control a motor, the motor controller comprising:
a position controller configured to generate a speed command based on a position error between a position command and a motor position;
a speed controller configured to generate a torque command based on a speed error between the speed command and a motor speed;
a first integrator configured to calculate an integral value of the position error to be added to the position error, the first integrator configured to multiply the integral value of the position error by an imperfect integral gain and to gradually decrease an output of the first integrator based on a resultant product; and
a second integrator configured to calculate an integral value of the speed error that is added to the speed error by the speed controller,
wherein the motor controller is configured to output the torque command to the motor.

13. The motor controller according to claim 1, wherein the first integrator receives the position error as the input and is configured to perform the negative feedback to the position error.

14. The motor controller according to claim 1, wherein the position controller is configured to add only the integral value of the position error to the position error.

15. The method according to claim 6, wherein the adding the integral value of the position error to the position error is performed by adding only the integral value of the position error to the position error.

16. The motor controller according to claim 12, wherein the position controller is configured to add only the integral value of the position error to the position error.

17. The motor controller according to claim 1, wherein the speed controller is configured to multiply the sum of the integral value of the speed error and the speed error by a speed control gain.

18. The method according to claim 6, further comprising multiplying the sum of the integral value of the speed error and the speed error by a speed control gain.

19. The motor controller according to claim 12, wherein the speed controller is configured to multiply the sum of the integral value of the speed error and the speed error by a speed control gain.

20. The motor controller according to claim 1, wherein the motor controller is configured to control the motor with the torque command output to the motor.

21. The method according to claim 6, further comprising controlling the motor with the torque command output to the motor.

22. The motor controller according to claim 12, wherein the motor controller is configured to control the motor with the torque command output to the motor.

* * * * *